(No Model.)

R. TRAGARDH.
VELOCIPEDE.

No. 250,607. Patented Dec. 6, 1881.

Attest
Paul A. Staley
[signature]

Inventor
per Rudolph Tragardh
[signature]
Attorney

UNITED STATES PATENT OFFICE.

RUDOLPH TRAGARDH, OF CHICAGO, ILLINOIS.

VELOCIPEDE.

SPECIFICATION forming part of Letters Patent No. 250,607, dated December 6, 1881.

Application filed August 16, 1881. (No model.)

*To all whom it may concern:*

Be it known that I, RUDOLPH TRAGARDH, a citizen of the United States, residing at Chicago, in the county of Cook and State of Illinois, have invented a new and useful Improvement in Velocipedes, of which the following is a specification.

My invention relates to improvements in velocipedes, the object being to provide such vehicles with a double suspension propelling-wheel in front having two separate points of contact with the ground or floor; and the invention consists in the construction of parts, as hereinafter more fully described and claimed.

Figure 1:
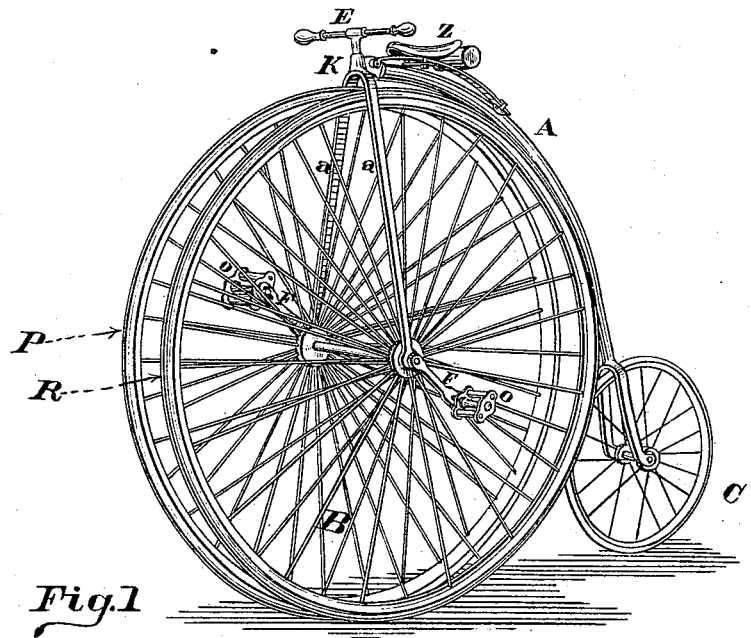
Figure 2:
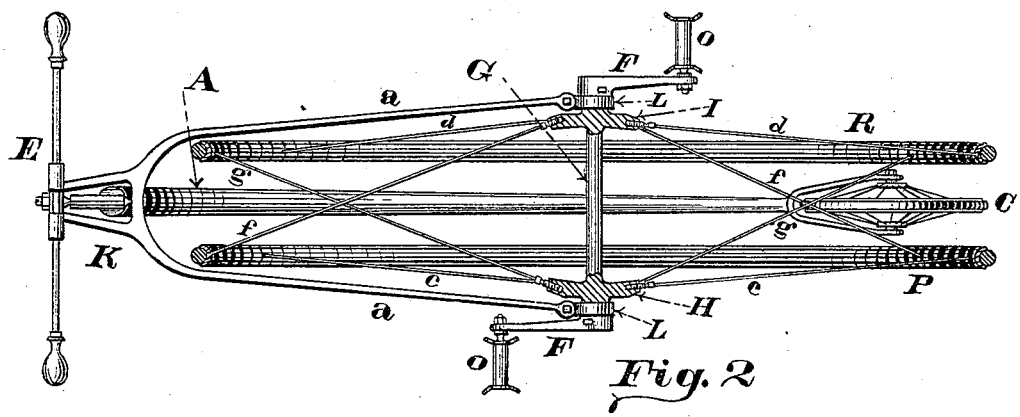

In the annexed drawings, Figure 1 is a perspective view of a velocipede embodying my invention. Fig. 2 is a vertical elevation of the same, with the double wheel in section.

Like letters indicate like parts.

B represents the large propelling-wheel of a velocipede of my improved bicycle pattern. C is a small hind wheel, connected to the head K in the ordinary manner by the reach A. E is the handle by means of which the machine is guided. Z is the seat.

The power is applied to wheel B by the feet of the operator, through the treadles O O, cranks F F, and axle G, in the ordinary manner.

The wheel B, which I term a "double suspension - wheel," suspended and running between the forks $a$ $a$ of head K, has two separate fellies and tires, P and R, and each is connected to both the hubs H and I, thus making a double wheel having two points of contact, which allows the machine to remain upright when at rest, which cannot be done with a bicycle as heretofore constructed. The wheel B is also provided with draw-spokes similar to those used in the construction of bicycles of the modern pattern, and are so arranged that every other or alternate spoke in each felly, as $c$ and $f$ and $g$ and $d$, are attached to opposite hubs, H and I, by means of screw adjustment that allows the spokes to be tightened at will or loosened as desired, thus furnishing the means of truing up or tightening the wheel at any time, all of which will be readily understood by reference to the drawings. The forks $a$ $a$ are connected at their lower ends to bearings L L in the ordinary manner.

Having described my invention, what I claim as new, and desire to secure by Letters Patent, is—

1. A velocipede having a pair of wheels suspended between the forks of the head, each wheel of the pair being connected to both hubs, and a small hind wheel, substantially as shown and described.

2. In a velocipede, a double suspension-wheel composed of two wheels on the same axle, and both suspended between the forks of the head, and the wheels connected together by spokes so arranged that alternate spokes are attached to opposite hubs, substantially as described and shown.

3. In a velocipede, the double suspension-wheel B, suspended and running between the forks $a$ $a$ on head K, in combination with reach A and wheel C, substantially as described and shown, and for the purpose set forth.

4. In a velocipede, the double suspension-wheel B, composed of two wheels connected by spokes so arranged that the alternate spokes are attached to opposite hubs by means of a screw adjustment, whereby the wheel is tightened, substantially as set forth and described.

RUDOLPH TRAGARDH.

Witnesses:
J. F. GOULD,
FRANK JOHNSON.